United States Patent
Sugawa (10) Patent No.: US 12,090,976 B2
(45) Date of Patent: Sep. 17, 2024

(54) FRONT STRUCTURE OF BODY-ON-FRAME VEHICLE AND METHOD OF REPLACING BRAKE ACTUATOR

(71) Applicant: TOYOTA JIDOSHA KABUSHIKI KAISHA, Toyota (JP)

(72) Inventor: Hideki Sugawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/141,716

(22) Filed: May 1, 2023

(65) Prior Publication Data

US 2024/0001903 A1  Jan. 4, 2024

(30) Foreign Application Priority Data

Jul. 4, 2022 (JP) ................................. 2022-107946

(51) Int. Cl.
*B60T 17/08* (2006.01)
*B62D 21/09* (2006.01)
*B62D 21/12* (2006.01)
*B62D 21/15* (2006.01)

(52) U.S. Cl.
CPC .......... *B60T 17/088* (2013.01); *B62D 21/152* (2013.01)

(58) Field of Classification Search
CPC ....... B60T 17/08; B60T 17/088; B62D 21/09; B62D 21/12; B62D 21/152
See application file for complete search history.

(56) References Cited

U.S. PATENT DOCUMENTS

| | | | |
|---|---|---|---|
| 2003/0168844 A1* | 9/2003 | Borroni-Bird | B60T 8/00 280/784 |
| 2003/0205916 A1* | 11/2003 | Seksaria | B62D 25/084 296/192 |
| 2020/0317180 A1 | 10/2020 | Fujimoto | |
| 2020/0406736 A1* | 12/2020 | Hattori | B60G 11/27 |

FOREIGN PATENT DOCUMENTS

| | | | | |
|---|---|---|---|---|
| DE | 202020103686 U1 * | 11/2021 | | B60S 9/12 |
| JP | 2001-180467 A | 7/2001 | | |
| JP | 3995731 B2 * | 10/2007 | | |
| JP | 2019-217905 A | 12/2019 | | |
| JP | 2020-168931 A | 10/2020 | | |
| JP | 2020168930 A * | 10/2020 | | B60T 11/10 |
| WO | WO-2021145056 A1 * | 7/2021 | | B60K 1/04 |

* cited by examiner

*Primary Examiner* — Jason D Shanske
*Assistant Examiner* — Daniel M. Keck
(74) *Attorney, Agent, or Firm* — Sughrue Mion, PLLC (57) ABSTRACT

A front structure of a body-on-frame vehicle includes: a pair of left and right side rails extending in a vehicle front-rear direction; cross-members extending in a vehicle width direction and coupling the side rails together; a motor for traveling disposed between the cross-members; and a brake actuator disposed on a vehicle rear side relative to the cross-member and disposed on an inner side in the vehicle width direction relative to the side rail. The front structure is configured such that, when the motor is removed, a worker is able to access the brake actuator from a space between the cross-members.

6 Claims, 7 Drawing Sheets

FRONT STRUCTURE OF BODY-ON-FRAME VEHICLE AND METHOD OF REPLACING BRAKE ACTUATOR

CROSS-REFERENCE TO RELATED APPLICATION

This application claims priority to Japanese Patent Application No. 2022-107946 filed on Jul. 4, 2022, incorporated herein by reference in its entirety.

BACKGROUND

1. Technical Field

The present disclosure relates to a front structure of a body-on-frame vehicle and a method of replacing a brake actuator.

2. Description of Related Art

Conventionally, a brake actuator that is disposed between a master cylinder and a wheel brake and controls a hydraulic pressure supplied to the wheel brake is known (e.g., see Japanese Unexamined Patent Application Publication No. 2001-180467 (JP 2001-180467 A)). This brake actuator is disposed inside an engine compartment and mounted at a corner where an apron side member and a dashboard cross-member are joined together.

SUMMARY

Here, in the case where the brake actuator as described above is installed in a body-on-frame vehicle, it is desirable that a worker can easily perform the work of replacing the brake actuator.

The present disclosure has been contrived to solve this challenge, and an object of the present disclosure is to provide a front structure of a body-on-frame vehicle and a method of replacing a brake actuator that allow easy replacement of a brake actuator.

A front structure of a body-on-frame vehicle according to the present disclosure includes: a pair of left and right side rails extending in a vehicle front-rear direction; a first cross-member extending in a vehicle width direction and coupling the side rails together; and a second cross-member disposed on a vehicle rear side relative to the first cross-member, extending in the vehicle width direction, and coupling the side rails together. The front structure of a body-on-frame vehicle includes a motive power source for traveling disposed between the first cross-member and the second cross-member, and a brake actuator disposed on the vehicle rear side relative to the second cross-member and disposed on an inner side in the vehicle width direction relative to the side rails, and is configured such that, when the motive power source is removed, a worker is able to access the brake actuator from a space between the first cross-member and the second cross-member.

This configuration allows a worker to easily replace the brake actuator by, after the motive power source is removed, entering the space between the first cross-member and the second cross-member and accessing the brake actuator.

The above front structure may include a mount part to which the brake actuator is mounted using a fastening member; a first support part that is coupled to a rear surface of the second cross-member and supports the mount part; and a second support part that is coupled to an inner surface of the side rail and supports the mount part. The front structure may be configured such that, when the motive power source is removed, a worker is able to access the fastening member from the space between the first cross-member and the second cross-member.

In this case, the front structure may include a pipe joint that is disposed in a flow passage leading from a master cylinder to the brake actuator and mounted to the second support part. A first pipe extending from the master cylinder may be connected to one end portion of the pipe joint, and a second pipe extending from the brake actuator toward the vehicle rear side may be connected to the other end portion of the pipe joint. The front structure may be configured such that, when the motive power source is removed, a worker is able to access a first connection part between the second pipe and the pipe joint from the space between the first cross-member and the second cross-member.

In the above front structure, a third pipe leading from the brake actuator to the wheel brake may be provided so as to extend upward from an upper part of the brake actuator. The front structure may be configured such that, when the motive power source is removed, a worker is able to access a second connection part between the third pipe and the brake actuator from the space between the first cross-member and the second cross-member.

In the above front structure, the motive power source may include a motor; a battery that stores electricity to drive the motor may be disposed on the vehicle rear side of the second cross-member; and a cooling pipe for cooling the battery may be disposed on the inner side in the vehicle width direction of the brake actuator.

A method of replacing a brake actuator according to the present disclosure is a method of replacing a brake actuator provided in a body-on-frame vehicle. The body-on-frame vehicle includes: a pair of left and right side rails extending in a vehicle front-rear direction; a first cross-member extending in a vehicle width direction and coupling the side rails together; a second cross-member disposed on a vehicle rear side relative to the first cross-member, extending in the vehicle width direction, and coupling the side rails together; a motive power source for traveling disposed between the first cross-member and the second cross-member; and a brake actuator disposed on a vehicle rear side relative to the second cross-member and disposed on an inner side in the vehicle width direction relative to the side rails. The method of replacing a brake actuator includes: a step of removing the motive power source; a step in which a worker enters a space between the first cross-member and the second cross-member; and a step in which the worker having entered the space between the first cross-member and the second cross-member accesses the brake actuator.

This configuration allows a worker to easily replace the brake actuator by, after the motive power source is removed, entering the space between the first cross-member and the second cross-member and accessing the brake actuator.

The front structure of a body-on-frame vehicle and the method of replacing a brake actuator of the present disclosure allow easy replacement of a brake actuator.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

One embodiment of the present disclosure will be described below.

Figure 1:
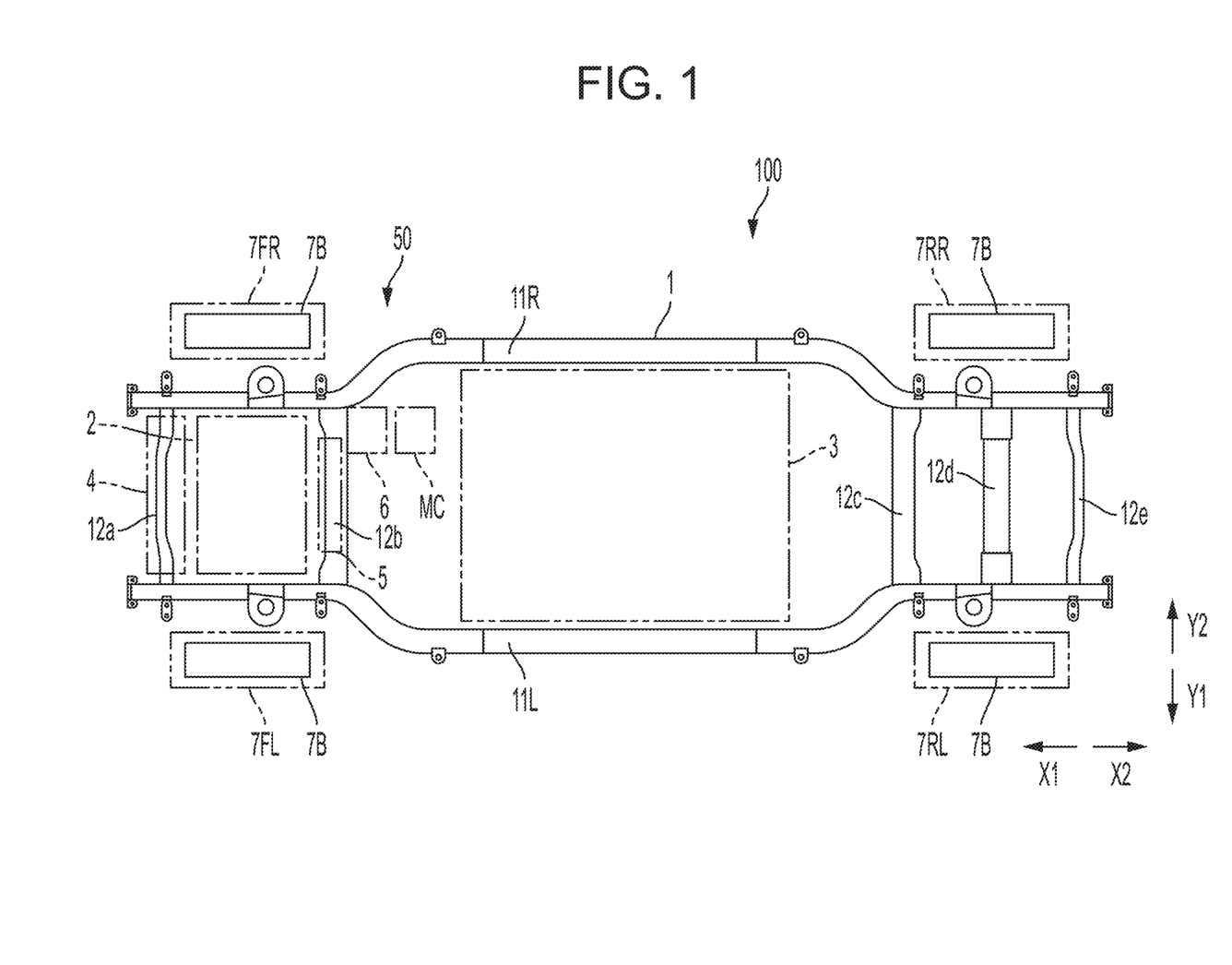
FIG. 1 is a plan view schematically showing an overview of a body-on-frame vehicle according to an embodiment.

First, an overview of a body-on-frame vehicle 100 to which a front structure 50 according to one embodiment of the present disclosure is applied will be described with reference to FIG. 1. In FIG. 1 and other drawings, the side of the X1 direction is a vehicle front side; the side of the X2 direction is a vehicle rear side; the side of the Y1 direction is a left side, and the side of the Y2 direction is a right side.

The body-on-frame vehicle 100 includes a frame skeleton 1 and a cabin (not shown), with the cabin placed on the frame skeleton 1. For example, the cabin is provided on the entire frame skeleton 1, and the body-on-frame vehicle 100 is not provided with an engine hood or a cab tilting mechanism. As shown in FIG. 1, the body-on-frame vehicle 100 includes a motor 2, a battery 3, a cooling device including a radiator 4, a steering device including a steering gear 5, and a brake device including a brake actuator 6. The motor 2 is one example of the "motive power source" of the present disclosure.

The motor 2 is provided to output a driving force for the vehicle to travel. The battery 3 can be charged and discharged, and is configured to store electricity for driving the motor 2. The cooling device is provided to cool the motor 2 and the battery 3. The cooling device is configured to circulate a cooling medium between the radiator 4 on one hand and the motor 2 and the battery 3 on the other hand by a pump (not shown). The radiator 4 is provided to cool the cooling medium through heat exchange with outside air. The steering device is provided to adjust turning angles of a left front wheel 7FL and a right front wheel 7FR.

The brake device includes a master cylinder MC, wheel brakes 7B disposed on the respective wheels (the left front wheel 7FL, the right front wheel 7FR, a left rear wheel 7RL, and a right rear wheel 7RR), and a brake actuator 6 disposed between the master cylinder MC and the wheel brake 7B. The master cylinder MC is configured to supply a hydraulic pressure to the brake actuator 6 at the time of braking. The brake actuator 6 is provided to control the hydraulic pressure supplied to each wheel brake at the time of braking.

The wheel brakes 7B are, for example, disc brakes or drum brakes and configured to generate a braking force according to the hydraulic pressure supplied.

The frame skeleton 1 includes side rails 11L, 11R and cross-members 12a to 12e. The side rails 11L, 11R are formed so as to extend in a vehicle front-rear direction (the X1 and X2 directions) and provided as a left and right pair. The side rails 11L, 11R are disposed facing each other in a vehicle width direction (the Y1 and Y2 directions), with the side rail 11L disposed on one side (the left side) in the vehicle width direction and the side rail 11R disposed on the other side (the right side) in the vehicle width direction. The cross-members 12a to 12e are formed so as to extend in the vehicle width direction and configured to couple the side rails 11L, 11R together. The cross-members 12a to 12e are disposed at intervals in the vehicle front-rear direction. The cross-members 12a, 12b are disposed on the vehicle front side and the cross-members 12c to 12e are disposed on the vehicle rear side. The cross-members 12a, 12b are examples of the "first cross-member" and the "second cross-member," respectively, of the present disclosure.

Here, the front structure 50 of the body-on-frame vehicle 100 includes the side rails 11L, 11R, the cross-members 12a, 12b, the motor 2, the brake actuator 6, and others. The cross-member 12a is a cross-member that is disposed on a frontmost side in the vehicle front-rear direction, and the cross-member 12b is a cross-member that is disposed second from the vehicle front side. Thus, the cross-member 12b is disposed on the vehicle rear side relative to the cross-member 12a. When seen in a planar manner, the motor 2 is disposed between the cross-members 12a, 12b.

When seen in a planar manner, the radiator 4 is disposed frontward of the motor 2 in the vehicle front-rear direction. When seen in a planar manner, the steering gear 5 is disposed rearward of the motor 2 in the vehicle front-rear direction. When seen in a planar manner, the battery 3 is provided over a large portion of a central part in the vehicle front-rear direction. Thus, the battery 3 is disposed rearward of the cross-member 12b in the vehicle front-rear direction. Cooling pipes 41 (see FIG. 6) that are passages for the cooling medium of the cooling device are connected to the battery 3. The cooling pipes 41 are provided to cool the battery 3 and disposed on the inner side in the vehicle width direction of the brake actuator 6.

Brake Actuator

Next, the structure of the brake actuator 6 in the front structure 50 of this embodiment will be described with reference to FIG. 2 to FIG. 4.

Figure 2:
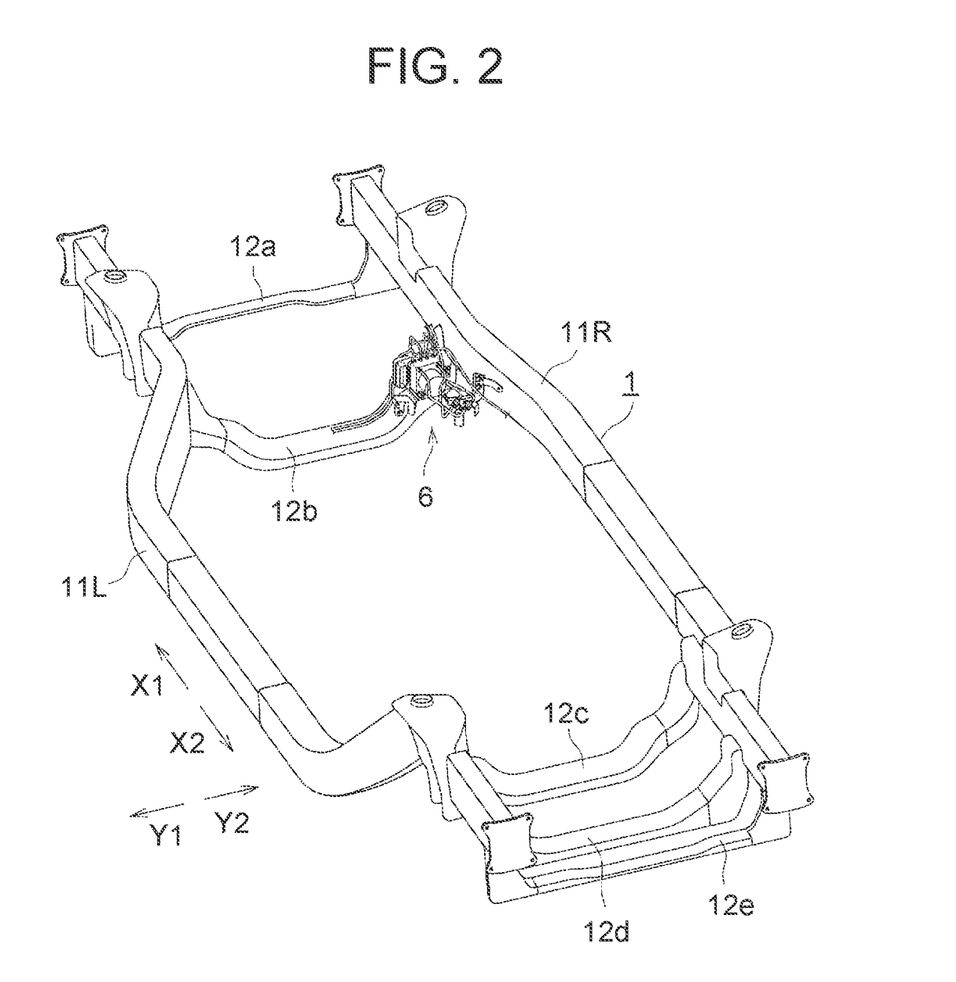
FIG. 2 is a perspective view showing a frame skeleton of the body-on-frame vehicle of FIG. 1.

As shown in FIG. 2, the brake actuator 6 is mounted on a rear surface (a surface on the vehicle rear side) of the cross-member 12b and an inner surface of the side rail 11R. Thus, the brake actuator 6 is disposed on the vehicle rear side relative to the cross-member 12b and disposed on the inner side in the vehicle width direction relative to the side rail 11R. Therefore, when the motor 2 (see FIG. 1) is removed, a worker W (see FIG. 5) can access the brake actuator 6 from a space between the cross-members 12a, 12b.

Figure 3:
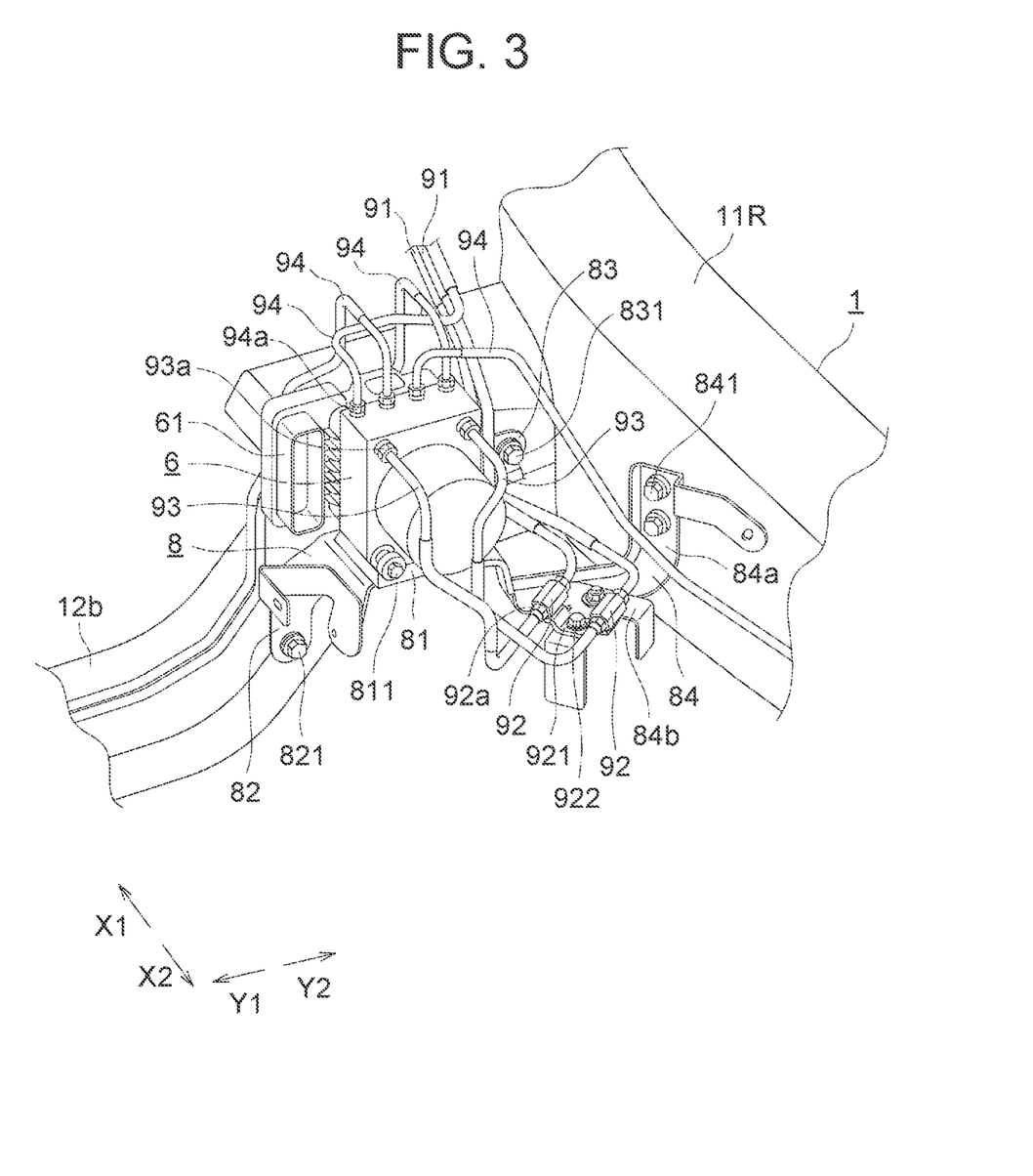
FIG. 3 is a view showing a close-up of a brake actuator mounted on the frame skeleton of FIG. 2.
Figure 4:
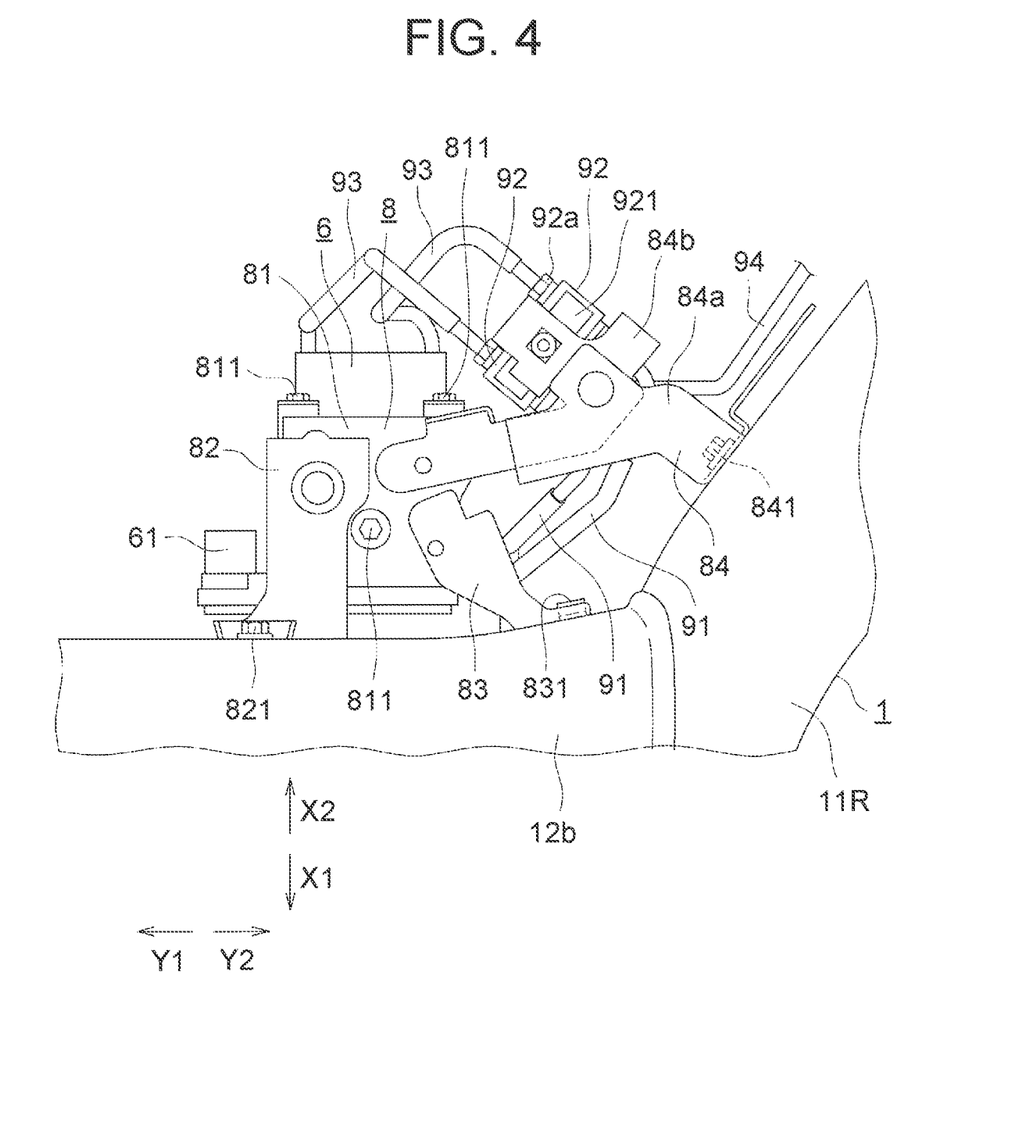
FIG. 4 is a view of the brake actuator of FIG. 3 as seen from a lower side.

As shown in FIG. 3, the brake actuator 6 is mounted on the frame skeleton 1 using a bracket 8. The bracket 8 has a mount part 81 to which the brake actuator 6 is mounted and support parts 82 to 84 that support the mount part 81. The support parts 82, 83 are one example of the "first support part" of the present disclosure, and the support part 84 is one example of the "second support part" of the present disclosure.

The mount part 81 is formed in a plate shape such that the brake actuator 6 can be placed thereon. The brake actuator 6 is mounted on the mount part 81 with bolts 811 through bushes. For example, as shown in FIG. 4, the brake actuator 6 is mounted on the mount part 81 with three bolts 811. One of the three bolts 811 is disposed on a bottom surface of the brake actuator 6 and the other two of the three bolts 811 are disposed near a lower end portion of a rear surface (a surface on the vehicle rear side) of the brake actuator 6. The bolts 811 are one example of the "fastening member" of the present disclosure.

The support part 82 is disposed on the inner side in the vehicle width direction relative to the support parts 83, 84. One end portion of the support part 82 is joined to a lower surface of the mount part 81. The other end portion of the support part 82 is coupled to the rear surface of the cross-member 12b with a bolt 821. The other end portion of the support part 82 is disposed on the inner side in the vehicle width direction relative to the brake actuator 6.

The support part 83 is disposed on the vehicle front side relative to the support part 84. One end portion of the support part 83 is joined to the lower surface of the mount part 81. The other end portion of the support part 83 is coupled to the rear surface of the cross-member 12b with a bolt 831. The other end portion of the support part 83 is disposed on the outer side in the vehicle width direction relative to the brake actuator 6.

The support part 84 is formed as plate members 84a, 84b are combined with each other. One end portion of the support part 84 is joined to the lower surface of the mount part 81. The other end portion of the support part 84 is coupled to the inner surface of the side rail 11R with a bolt 841. The other end portion of the support part 84 is disposed on the outer side in the vehicle width direction relative to the brake actuator 6 and disposed on the vehicle rear side relative to the other end portion of the support part 82 and the other end portion of the support part 83.

The brake actuator 6 includes an actuator main body (not shown) that controls the hydraulic pressure supplied to each wheel brake, and an ECU (not shown) that controls the actuator main body. As shown in FIG. 3, the brake actuator 6 is provided with a connector 61 to which a wire harness (not shown) for communication of the ECU is connected. For example, two flow passages leading from the master cylinder and four flow passages leading to the respective wheel brakes are connected to the actuator main body.

The two flow passages leading from the master cylinder to the brake actuator 6 are each composed of a pipe 91, a pipe joint 92, and a pipe 93. The pipe 91 is formed so as to extend from the master cylinder toward the vehicle rear side along the side rail 11R. The pipe joint 92 is provided to connect the pipes 91, 93 to each other. Specifically, the pipe 91 extending from the master cylinder is connected to one end portion of the pipe joint 92, and the pipe 93 extending from the rear surface of the brake actuator 6 toward the vehicle rear side is connected to the other end portion of the pipe joint 92. The two pipe joints 92 are coupled together by a coupling plate 921, and the coupling plate 921 is mounted on an intermediate portion of the support part 84 with a bolt 922. Thus, the support part 84 also functions to support the two pipe joints 92. These two pipe joints 92 are disposed on the vehicle rear side of the brake actuator 6 and disposed on the outer side in the vehicle width direction of the brake actuator 6. The pipes 91, 93 are examples of the "first pipe" and the "second pipe," respectively, of the present disclosure.

The four flow passages leading from the brake actuator 6 to the respective wheel brakes are each formed by a pipe 94. The pipes 94 are formed so as to extend upward from an upper surface of the brake actuator 6 and lead to the respective wheel brakes. The pipe 94 leading to the wheel brake of the left front wheel 7FL (see FIG. 1) is formed so as to extend from the brake actuator 6 toward the left side along the cross-member 12b and then extend toward the vehicle front side along the side rail 11L (see FIG. 1). The pipe 94 leading to the wheel brake of the left rear wheel 7RL (see FIG. 1) is formed so as to extend from the brake actuator 6 toward the left side along the cross-member 12b and then extend toward the vehicle rear side along the side rail 11L. The pipe 94 leading to the wheel brake of the right front wheel 7FR (see FIG. 1) is formed so as to extend from the brake actuator 6 toward the vehicle front side along the side rail 11R. The pipe 94 leading to the wheel brake of the right rear wheel 7RR (see FIG. 1) is formed so as to extend from the brake actuator 6 toward the vehicle rear side along the side rail 11R. The pipes 94 are one example of the "third pipe" of the present disclosure.

Method of Replacing Brake Actuator

Figure 5:
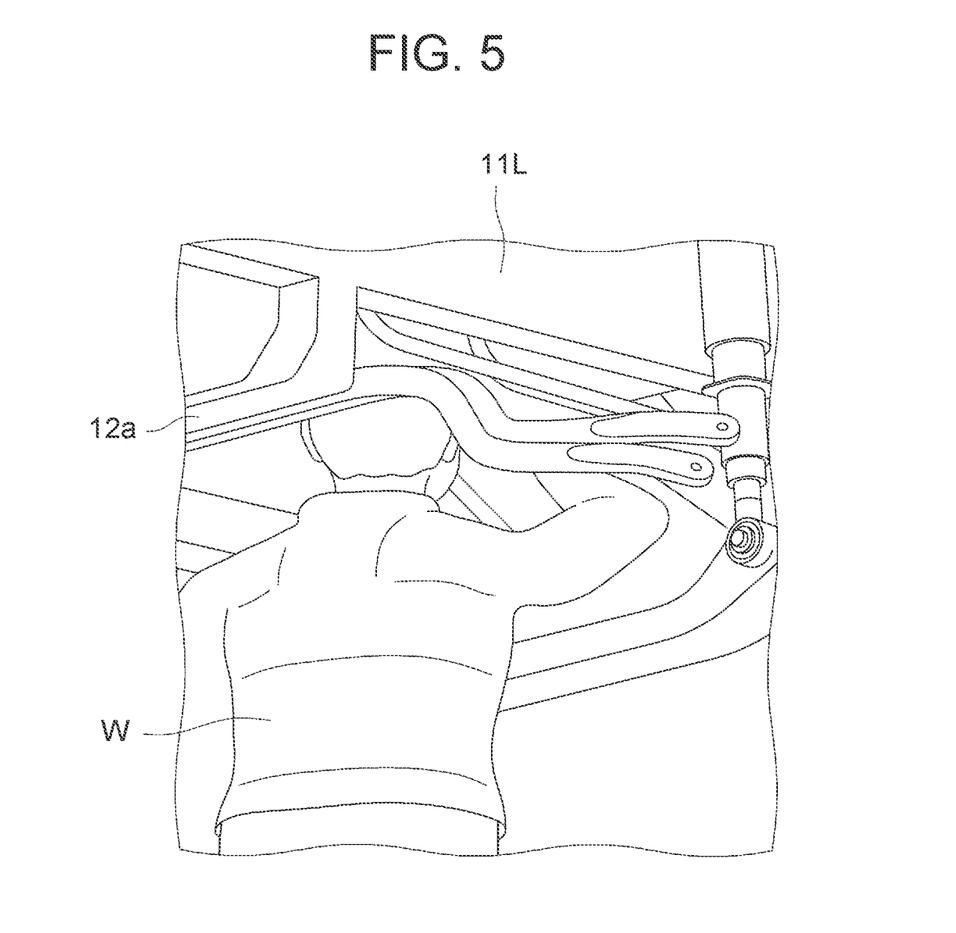
FIG. 5 is a view showing a state where a worker has entered a space between cross-members after a motor has been removed from the frame skeleton.
Figure 6:
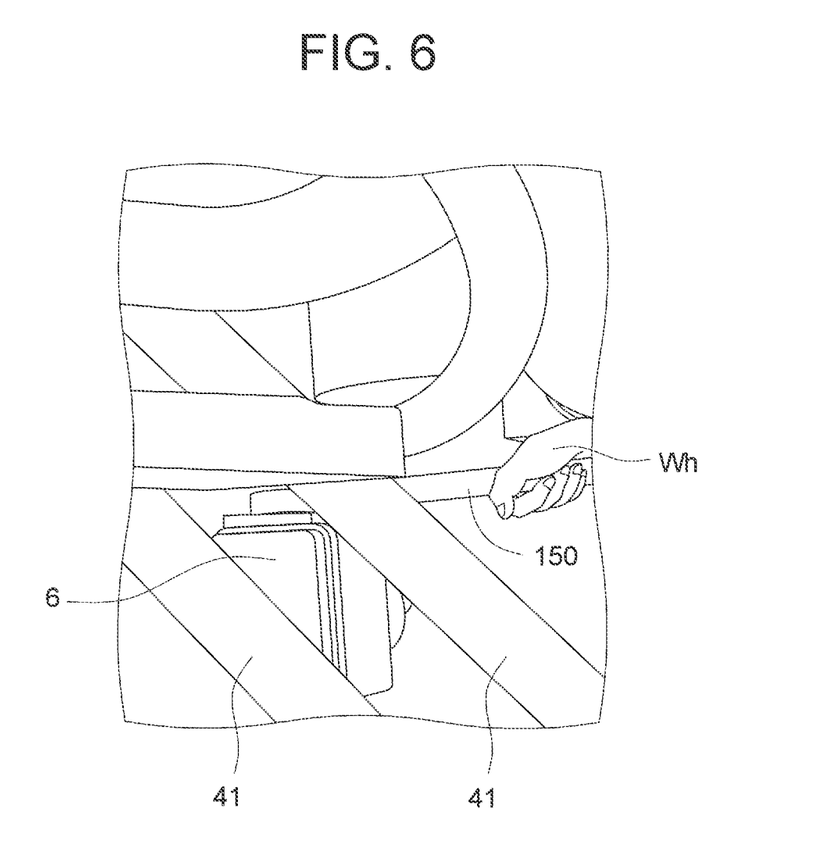
FIG. 6 is a view showing a moment when a pipe is removed from the brake actuator using a flare nut wrench, and showing one example of what is seen by the worker of FIG. 5.

Next, a method of replacing the brake actuator 6 in the front structure 50 of this embodiment will be described with reference to FIG. 5 to FIG. 7. Replacement of the brake actuator 6 is performed at the time of periodic replacement of the motor 2 and the steering gear 5.

First, the motor 2 and the steering gear 5 are removed from the frame skeleton 1. As a result, a space that the worker W can enter is created between the cross-members 12a, 12b. Then, as shown in FIG. 5, the worker W enters the space between the cross-members 12a, 12b where the motor 2 etc. have been located from under the frame skeleton 1. This worker W can access the brake actuator 6 that is mounted on the rear surface of the cross-member 12b and the inner surface of the side rail 11R.

Specifically, the worker W can access, from the space between the cross-members 12a, 12b, the wire harness (not shown) connected to the connector 61, flare nuts 94a connecting the pipes 94 to the brake actuator 6, flare nuts 92a connecting the pipes 93 to the pipe joints 92, and the bolts 811 for mounting the brake actuator 6 to the bracket 8. The flare nuts 92a, 94a are examples of the "first connection part" and the "second connection part," respectively, of the present disclosure.

Here, the cooling pipes 41 are disposed on the inner side in the vehicle width direction of the brake actuator 6. Thus, as shown in FIG. 6, the field of vision of the worker W is partially blocked, but the worker W can visually recognize the brake actuator 6 through the gap between the cooling pipes 41. The work of removing the brake actuator 6 is performed by the worker W having entered the space between the cross-members 12a, 12b.

First, the worker W removes the wire harness from the connector 61. Next, the worker W sequentially unfastens the four flare nuts 94a using a flare nut wrench 150. Thus, the four pipes 94 are sequentially removed from the brake actuator 6. Reference sign Wh in FIG. 6 denotes a hand of the worker W holding the flare nut wrench 150.

Figure 7:
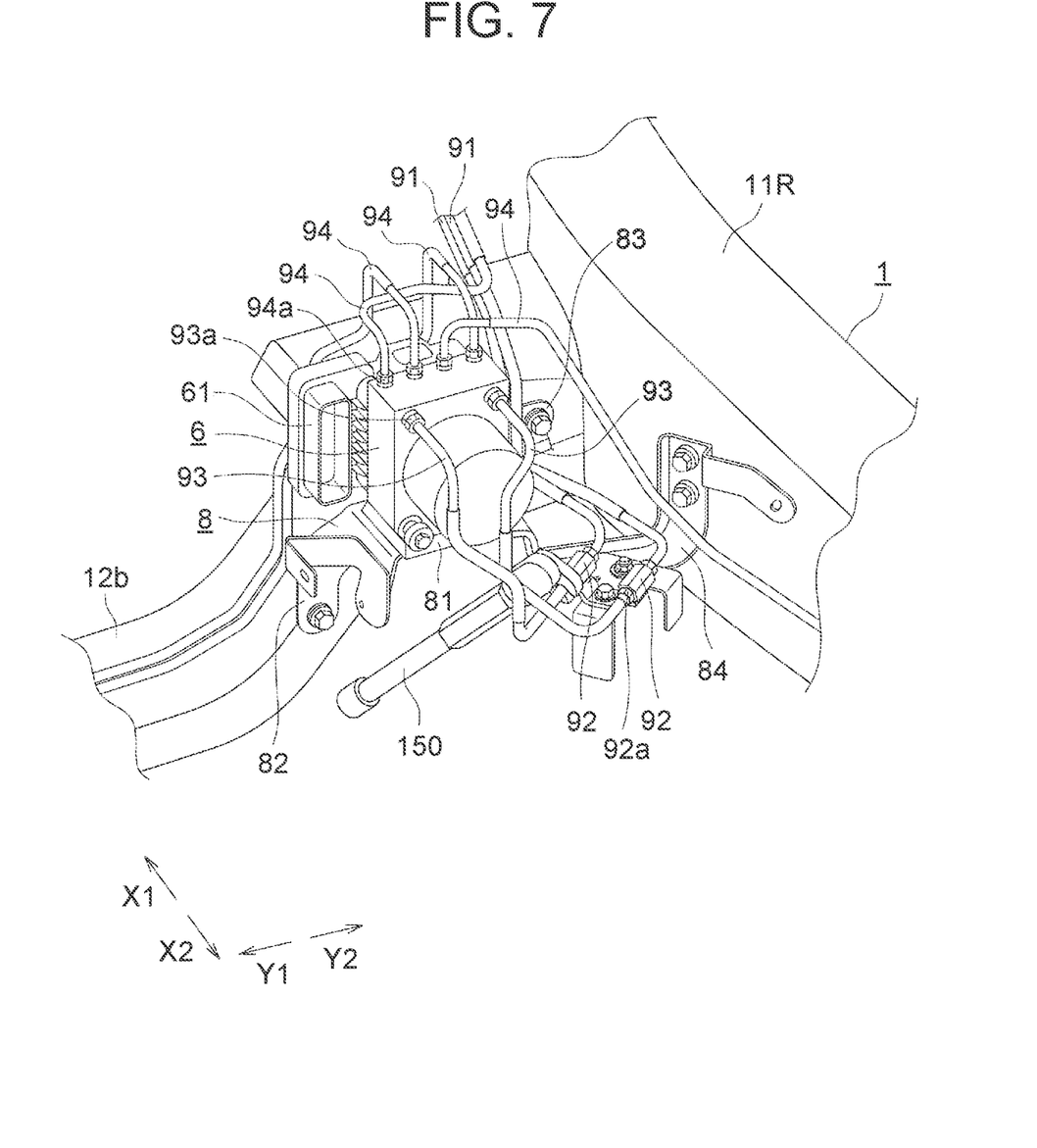
FIG. 7 is a view showing a moment when a pipe is removed from a pipe joint using the flare nut wrench.

As shown in FIG. 7, the worker W sequentially unfastens the two flare nuts 92a using the flare nut wrench 150. Thus, the two pipes 93 are sequentially removed from the pipe joints 92. In this embodiment, therefore, the pipes 93 are removed along with the brake actuator 6. This is because, in the state where the brake actuator 6 is mounted on the frame skeleton 1, it is difficult to perform the work of unfastening the flare nuts 93a that connect the pipes 93 to the brake actuator 6. That is, it is difficult to secure a space for swinging the flare nut wrench 150 to unfasten the flare nuts 93a.

Then, the worker W sequentially unfastens the three bolts 811 using a jig (not shown). Next, the worker W removes the brake actuator 6 from the bracket 8. In this way, the work of removing the brake actuator 6 is performed.

Thereafter, the work of mounting a new brake actuator (not shown) is performed by the worker W having entered the space between the cross-members 12a, 12b. This mounting work is performed in reverse order to the removing work.

Advantages

In this embodiment, as described above, the motor 2 is provided between the cross-members 12a, 12b and the brake actuator 6 is mounted on the rear surface of the cross-member 12b and the inner surface of the side rail 11R. This allows the worker W to easily replace the brake actuator 6, even in the body-on-frame vehicle 100 that is not provided with an engine hood or a cab tilting mechanism, by, after the motor 2 is removed, the worker W entering the space between the cross-members 12a, 12b and accessing the brake actuator 6. In addition, since the brake actuator 6 is disposed rearward of a crushable zone in the vehicle front-rear direction, the brake actuator 6 is less likely to get damaged in the event of a collision of the vehicle.

In this embodiment, the bracket 8 is mounted on the frame skeleton 1 and the brake actuator 6 is mounted on the bracket 8 with the bolts 811, so that the brake actuator 6 can be removed from the bracket 8 by unfastening the bolts 811.

In this embodiment, the pipe joints 92 are provided in the flow passages leading from the master cylinder to the brake actuator 6, so that the pipes 93 can be removed from the pipe joints 92 by unfastening the flare nuts 92a. Thus, the brake actuator 6 can be removed along with the pipes 93. In other words, the brake actuator 6 can be removed without unfastening the flare nuts 93a.

In this embodiment, the pipes 94 leading from the brake actuator 6 to the respective wheel brakes are provided, and the pipes 94 can be removed from the brake actuator 6 by unfastening the flare nuts 94a.

In this embodiment, since the cooling pipes 41 are disposed on the inner side in the vehicle width direction of the brake actuator 6, the brake actuator 6 can be visually recognized through the gap between the cooling pipes 41.

In this embodiment, the pipes 91 are routed along the side rail 11R and the pipes 94 are routed along the side rail 11R, the cross-member 12b, and the side rail 11L, which can simplify the shapes of the pipes and thereby reduce the cost.

Other Embodiments

The embodiment disclosed this time is illustrative in every respect and does not constitute a basis for restrictive interpretation. Therefore, the technical scope of the present disclosure should not be interpreted solely in accordance with the above-described embodiment but is defined based on the description of the claims. The technical scope of the present disclosure includes all changes that are equivalent in meaning and scope to the claims.

For example, while the motor 2 has been shown as the motive power source for traveling in the above embodiment, the present disclosure is not limited thereto; as the motive power source for traveling, an internal combustion engine may be provided along with the motor, or an internal combustion engine may be provided in place of the motor.

While the example in which the brake actuator 6 is mounted on the rear surface of the cross-member 12b and the inner surface of the side rail 11R has been shown in the above embodiment, the present disclosure is not limited thereto; the brake actuator may be mounted on the rear surface of the cross-member or the inner surface of the side rail.

While the example in which the pipe joints 92 are provided has been shown in the above embodiment, the present disclosure is not limited thereto; the pipe joints may be omitted as long as a work space for removing the pipes from the brake actuator can be secured.

While the example in which the pipes 94 leading to the wheel brakes are provided so as to extend upward from the upper surface of the brake actuator 6 has been shown in the above embodiment, the present disclosure is not limited thereto; the pipes leading to the wheel brakes may be provided so as to extend from a surface of the brake actuator other than the upper surface (e.g., a side surface).

While the example in which the cooling pipes 41 are disposed on the inner side in the vehicle width direction of the brake actuator 6 has been shown in the above embodiment, the present disclosure is not limited thereto; the cooling pipes need not be disposed on the inner side in the vehicle width direction of the brake actuator.

In the above embodiment, a transmission that changes the speed of a motor output and a differential device that distributes an output of the transmission may be included inside a case of the motor 2.

In the above embodiment, the order of the work of removing the brake actuator 6 is one example and the order is not limited to the one described above.

The present disclosure is applicable to a front structure of a body-on-frame vehicle and a method of replacing a brake actuator.

What is claimed is:

1. A front structure of a body-on-frame vehicle comprising:
   left and right side rails extending in a vehicle front-rear direction;
   a first cross-member extending in a vehicle width direction and coupling the side rails together; and
   a second cross-member disposed on a vehicle rear side relative to the first cross-member, extending in the vehicle width direction, and coupling the side rails together,
   wherein the front structure includes:
   a motive power source for traveling disposed between the first cross-member and the second cross-member; and
   a brake actuator disposed on the vehicle rear side relative to the second cross-member and disposed on an inner side in the vehicle width direction relative to the side rails, and
   wherein the front structure is configured such that, when the motive power source is removed, a worker is able to access the brake actuator from a space between the first cross-member and the second cross-member.

2. The front structure according to claim 1, comprising:
   a mount part to which the brake actuator is mounted using a fastening member;
   a first support part that is coupled to a rear surface of the second cross-member and supports the mount part; and
   a second support part that is coupled to an inner surface of a side rail and supports the mount part, wherein
   the front structure is configured such that, when the motive power source is removed, a worker is able to access the fastening member from the space between the first cross-member and the second cross-member.

3. The front structure according to claim 2, comprising a pipe joint that is disposed in a flow passage leading from a master cylinder to the brake actuator and mounted to the second support part, wherein:
   a first pipe extending from the master cylinder is connected to one end portion of the pipe joint;
   a second pipe extending from the brake actuator toward the vehicle rear side is connected to the other end portion of the pipe joint; and the front structure is configured such that, when the motive power source is removed, a worker is able to access a first connection part between the second pipe and the pipe joint from the space between the first cross-member and the second cross-member.

4. The front structure according to claim 1, wherein:
a third pipe leading from the brake actuator to a wheel brake is provided so as to extend upward from an upper part of the brake actuator; and
the front structure is configured such that, when the motive power source is removed, a worker is able to access a second connection part between the third pipe and the brake actuator from the space between the first cross-member and the second cross-member.

5. The front structure according to claim 1, wherein:
the motive power source includes a motor;
a battery that stores electricity to drive the motor is disposed on the vehicle rear side of the second cross-member; and
a cooling pipe for cooling the battery is disposed on the inner side in the vehicle width direction of the brake actuator.

6. A method of replacing a brake actuator provided in a body-on-frame vehicle,
the body-on-frame vehicle including: left and right side rails extending in a vehicle front-rear direction; a first cross-member extending in a vehicle width direction and coupling the side rails together; a second cross-member disposed on a vehicle rear side relative to the first cross-member, extending in the vehicle width direction, and coupling the side rails together; a motive power source for traveling disposed between the first cross-member and the second cross-member; and a brake actuator disposed on a vehicle rear side relative to the second cross-member and disposed on an inner side in the vehicle width direction relative to the side rails,
the method comprising:
a step of removing the motive power source;
a step in which a worker enters a space between the first cross-member and the second cross-member; and
a step in which the worker having entered the space between the first cross-member and the second cross-member accesses the brake actuator.

\* \* \* \* \*